Aug. 5, 1958  W. C. ASHLEY ET AL  2,845,650
MASTIC-BACKED METAL WOOL SCOURING PAD
Filed Dec. 26, 1952

WARREN C. ASHLEY
STUART O. FIEDLER
JOHAN BJORKSTEN
    INVENTORS

BY
    Attorney

United States Patent Office 2,845,650
Patented Aug. 5, 1958

2,845,650

MASTIC-BACKED METAL WOOL SCOURING PAD

Warren C. Ashley, Hinsdale, Ill., Stuart O. Fiedler, Cleveland, Ohio, and Johan Bjorksten, Madison, Wis., assignors to Bjorksten Research Laboratories, Inc., Madison, Wis., a corporation of Illinois Application December 26, 1952, Serial No. 327,978

1 Claim. (Cl. 15—209)

This application relates to a new type of abrasive cleaning article and more particularly to such an article comprising a metal wool. This application is continuation-in-part of Serial No. 702,104, filed October 9, 1946, for Abrasive Article, and of Serial No. 170,161, filed June 24, 1950, for Abrasive Product, both of which are now abandoned.

Heretofore, metal wool, such as copper wool, steel wool, brass wool, and the like, has been provided with backings of different sorts to facilitate its use in cleaning such articles as pots and pans. Such backings have characteristically been either rigid such as those made from vulcanized rubber, wood or like materials, or have been flexible such as those made from fabrics or certain synthetic resins, or have been flexibly elastic or rubbery such as is the case with backings comprising rubber cements, rubber sheets, rubber cloth, and the like.

It is an object of the present invention to provide a backing for metal wool, and correspondingly, an article comprising metal wool and a backing, wherein said backing is a ductile material capable of undergoing plastic deformation that is, a material, which is pliant, pliable, plastic, impressionable, mastic-like, putty-like and thus non-elastic.

Figure 1:

Other objects will become apparent from the drawings and the following detailed description. Figure 1 is a cross sectional view of the article of the invention and Figure 2 is a perspective view thereof.

Figure 2:
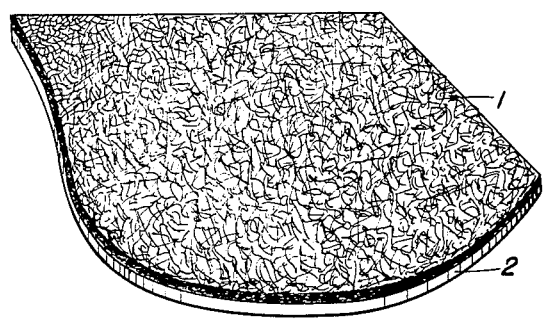

In accordance with our invention we may employ as shown in Figures 1 and 2 a backing sheet comprising a plastic material, such as, for example, a plasticized styrene resin, a plasticized vinyl resin, cellulose acetate, acrylic resin, or even glue or gelatine.

In short, we may employ a material which has the property of undergoing only plastic flow and may properly be described as ductile, pliant, impressionable, mastic-like and putty-like. Such a material is substantially non-elastic, that is a minimum stress produces permanent deformation and at least substantially all deformation produced in the material is permanent but the material must be tough enough to cohere.

Ductile, pliant, plasticized putty-like resin compositions are produced in the form of a film in any one of the manners known to the art, such as by casting, extrustion, calendering and the like.

A film of a tough putty-like mastic-like non-elastic backing material 2 is then coated with a layer of adhesive, and a layer of metal wool 1 is then secured to the said backing sheet by any suitable means. For example, the layer of metal wool together with the adhesive coated layer of ductile, pliant, pliable backing material is passed between two rollers. The metal wool is thus caused to adhere to the backing material by means of the adhesive.

The resulting laminate may then be slit or cut into pieces of a size suitable for household or other abrasive use.

The following examples illustrate the invention:

*Example 1*

A composition of 100 parts of copolymer of vinyl chloride and vinyl acetate (sold commercially as Vinylite, VYHH) is plasticized with a mixture of 80 parts of dibutoxyethyl phthalate (sold under the trade-name Kronisol) and 20 parts of castor oil. It is cast by pouring the melted mass onto a revolving water-cooled drum from which it is stripped in continuous operation. The stripped film is passed over the roller which is partly immersed in a solution of glue in water, and is then coated with a layer of wet glue.

Onto this is then pressed a layer of metal wool, which may be either steel wool, copper wool or brass wool, to effect lamination whereupon the whole is immersed in a formaldehyde tank so as to set the glue and render the same water insoluble.

*Example 2*

A sheet made from polystyrene having an average molecular weight of 20,000 and plasticized by 10% butyl phthallyl butyl glycollate so as to form a ductile, pliable, pliant, non-elastic base is coated with adhesive which may be solution of zein in 80% iso-propyl alcohol. A layer of metal wool is then laminated onto this product. The resulting article is slit and packaged.

*Example 3*

A composition consisting of 100 parts nitrocellulose, 20 parts cumarindene resin, 85 parts of chlorinated paraffin (40% chlorine) and 50 parts dibutyl phthalate was rolled into sheet form. The surface was tackified by saturating with butyl acetate and metal wool was pressed into the softened mass. When the solvent had evaporated, the sheet was cut into hand sized squares.

*Example 4*

A mixture of 100 parts hoof glue, 25 parts sodium dichromate, 60 parts glycerol, and 200 parts water was heated and agitated until homogeneous. After being cast into thin slabs and cooled, metal wool was laid on the soft gel. Upon exposure to sunlight, the glue was simultaneously dehydrated and insolubilized to further action by water. As a result of being plasticized with the glycerol the glue-based backing material was not hard and rigid but was ductile, pliant, plastic and non-elastic.

*Example 5*

85 parts of methyl methacrylate polymer with an average molecular weight of 10,000, 60 parts of dimethyl phthalate, 45 parts of diatomaceous earth, and 50 parts diisobutyl ketone were warmed and milled into a pliant, non-resilient mass. When calendered into sheets, metal wool was cemented to one face with a mixture of polyethyl acrylate in ethylene dichloride.

*Example 6*

Petroleum asphaltum with a melting point of 40° C. was fused with an equal weight of kaolin and cast into thin sheets. While still soft, metal wool sheets were laminated onto the surface with slight pressure.

*Example 7*

A plastisol of insoluble polyvinyl chloride and tricresyl phosphate was poured on to a smooth glass plate provided with low walls or dams on each side to form a thin layer of liquid plastisol. The plastisol layer was heated slightly in an oven to partially set or cure the material and a pad of metal wool was then pressed gently into the layer of partially deposited (cured) plastisol. The plastisol with the metal wool imbedded therein was then heated at 170° C. for about one hour to solvate the plastisol. Upon being removed from the oven it was found that the resultant highly plasticized polyvinyl chloride served as a ductile pliant non-elastic backing for the metal wool and conformed to the curves of the fingers in use and maintained such configuration upon removal of the hand.

Formation of a backing from a plastisol as described in Example 7 might suitably be carried out in a continuous process by casting the plastisol onto a moving belt or moving cylinder and feeding the metal fabric against one surface of such a plastisol film from a storage roller or other suitable storage means. The continuous belt or cylinder might suitably pass through zones of cooling and heating necessary to solvate and precipitate the polyvinyl chloride.

Plasticisors suitable for plastisols of polyvinyl chloride include tricresyl phosphate, dialkyl esters of endomethylene tetrahydrophthalic acid, orthonitrodiphenyl ether, dibutyl phthalate, butylphthallylbutyl glycollate, benzylbenzoate, diphenylethyl ether, dibenzylsebacate, glyceryl tributyrate, ethyl cinnamate, dodecyl phthalate, diethylene glycol benzoate, and the like.

The invention is not limited to any specific resin or plasticizer, although those mentioned in the examples are the preferred embodiments. The essence of the invention is to laminate metal wool to a base which is properly described as ductile and subject only to plastic flow, mastic-like, putty-like, pliant, pliable, impressionable and substantially non-elastic, in short, a backing material in which minimum stress produces permanent or near-permanent deformation and in which substantially all deformation produced is at least nearly permanent. Thus the backing sheet material may also be described as having substantially nearly infinite hysteresis.

In each of the examples, a product was obtained in which a backing sheet meeting this description was bonded to a sheet of metal wool. It may thus be seen that invention is broad in scope and is not to be limited except by the claim.

We claim:

As a new cleansing article, a layer of metal wool bonded to a backing sheet comprising a substantially flat sheet of ductile, plastic, pliable, pliant, impressionable, non-elastic organic material whereby said sheet conforms to the hand of a user and to a surface being cleaned.

References Cited in the file of this patent

UNITED STATES PATENTS

| | | |
|---|---|---|
| 1,649,894 | Field | Nov. 22, 1927 |
| 2,287,801 | Hepner | June 30, 1942 |
| 2,308,405 | Tully | Jan. 12, 1943 |
| 2,385,920 | Jenkins | Oct. 2, 1945 |
| 2,447,241 | Englund | Aug. 17, 1948 |
| 2,559,649 | Little et al. | July 10, 1951 |
| 2,569,954 | Ruebensaal | Oct. 2, 1951 |
| 2,642,407 | Bruins et al. | June 16, 1953 |